United States Patent
Aamir et al.

(10) Patent No.: US 11,939,506 B1
(45) Date of Patent: Mar. 26, 2024

(54) METHOD FOR REDUCING SOIL SALINITY USING SAWDUST AND CORN STOVER BASED BIOCHAR

(71) Applicant: KING FAISAL UNIVERSITY, Al-Ahsa (SA)

(72) Inventors: Muhammad Aamir, Al-Ahsa (SA); Muhammad Hassan, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/514,358

(22) Filed: Nov. 20, 2023

(51) Int. Cl.
 C09K 17/32 (2006.01)
 C09K 101/00 (2006.01)
 C09K 109/00 (2006.01)

(52) U.S. Cl.
 CPC .......... C09K 17/32 (2013.01); *C09K 2101/00* (2013.01); *C09K 2109/00* (2013.01)

(58) Field of Classification Search
 None
 See application file for complete search history.

(56) References Cited

U.S. PATENT DOCUMENTS

| | | | |
|---|---|---|---|
| 2011/0300586 A1* | 12/2011 | Liu | C08H 8/00 162/76 |
| 2016/0060114 A1* | 3/2016 | Miller | C10L 9/08 44/280 |
| 2021/0032538 A1* | 2/2021 | Cheng | C09K 17/04 |
| 2021/0037830 A1* | 2/2021 | Jennings | C05F 11/08 |
| 2021/0324258 A1* | 10/2021 | Allen, III | C09K 8/514 |

FOREIGN PATENT DOCUMENTS

| | | | | |
|---|---|---|---|---|
| CA | 2759130 A1 | 11/2010 | | |
| CN | 104312590 A | * | 1/2015 | ............ C09K 17/06 |
| CN | 106929034 A | * | 7/2017 | ............ C09K 17/40 |
| CN | 108865196 A | | 11/2018 | |
| CN | 110257077 A | * | 9/2019 | |
| CN | 110419286 A | | 11/2019 | |
| WO | 2021092694 A1 | | 5/2021 | |

OTHER PUBLICATIONS

CN 110326385 A, English Language Abstract. (Year: 2019).*
CN 107815315 A, English Language Abstract. (Year: 2018).*
CN 107916108 A, English Language Abstract. (Year: 2018).*
CN 110157449 A, English Language Abstract. (Year: 2019).*
CN 111234833 A, English Language Abstract. (Year: 2020).*
CN 111470918 A, English Language Abstract. (Year: 2020).*
Lynam, et al. "Hydrothermal carbonization of various lignocellulosic biomass." Biomass Conv. Bioref. 5, 173-181 (2015). https://doi.org/10.1007/s13399-014-0137-3.
Teribele, et al. "Hydrothermal Carbonization of Corn Stover: Structural Evolution of Hydro-Char and Degradation Kinetics." Energies. 2023; 16(7):3217. https://doi.org/10.3390/en16073217.
Krysanova, et al. "Biochar characteristics produced via hydrothermal carbonization and torrefaction of peat and sawdust" Fuel Nov. 15, 2022, vol. 328, 125220. https://doi.org/10.1016/j.fuel.2022.125220.

* cited by examiner

*Primary Examiner* — Joseph D Anthony
(74) *Attorney, Agent, or Firm* — Nath, Goldberg & Meyer; Richard C. Litman

(57) ABSTRACT

A method of reducing salinity of saline soil, comprising providing a sawdust and corn stover-based biochar, contacting the sawdust and corn stover-based biochar with a saline soil, and adsorbing salts in the soil with the sawdust and corn stover-based biochar. The sawdust and corn stover-based biochar can be prepared by hydrothermally carbonizing a mixture including equal proportions of corn stover and sawdust.

11 Claims, No Drawings

METHOD FOR REDUCING SOIL SALINITY USING SAWDUST AND CORN STOVER BASED BIOCHAR

BACKGROUND

1. Field

The present disclosure relates to reducing soil salinity and, particularly, to a sawdust and corn stover-based biochar for reducing soil salinity.

2. Description of the Related Art

Soil salinization is the main reason for the decline in agricultural output in many arid and semi-arid regions in the world. Excessive salt in the soil can cause changes in the physical and chemical properties of the soil, leading to degradation of the environment in which most crops are grown. Saline soil, also called saline-alkali soil, can include high concentrations of NaCl, $Ca(OH)_2$ and $Ca(SO)_4$. Frequently, the rootzone of the saline soils becomes too toxic for the plants to grow. As such, saline soil harms the ecosystem by contributing to low yields of crops which, thereby, severely restrict the development of agriculture, animal husbandry and forestry production.

It is believed that bioremediation methods can be effective in preventing and controlling salinization, which can reduce salt pollution while maintaining ecological balance.

Thus, a biochar for reducing soil salinity solving the aforementioned problems is desired.

SUMMARY

In an embodiment, the present subject matter relates to a method of reducing salinity of saline soil, comprising providing a sawdust and corn stover-based biochar, contacting the sawdust and corn stover-based biochar with a saline soil, and adsorbing salts in the soil with the corn stover-based biochar. The sawdust and corn stover-based biochar can be prepared by hydrothermally carbonizing a mixture including equal proportions of corn stover and sawdust.

According to an embodiment, the present subject matter relates to a method of preparing a sawdust and corn stover-based biochar, comprising hydrothermally carbonizing equal proportions of corn stover and sawdust in a reactor at a temperature ranging from about 200° C. to about 325° C., at a pressure ranging from about 1 bar to about 3 bars, and for a period of time ranging from about 4 hours to about 7 hours to produce a hydrochar. The hydrochar can be dried to provide the sawdust and corn stover-based biochar.

These and other features of the present subject matter will become readily apparent upon further review of the following specification.

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In an embodiment, the present subject matter relates to a method of reducing salinity of saline soil, comprising providing a sawdust and corn stover-based biochar, contacting the sawdust and corn stover-based biochar with a saline soil, and adsorbing salts in the soil with the corn stover-based biochar. In an embodiment, the sawdust and corn stover-based biochar can be contacted with the soil for a period of time ranging from about 40 days to about 75 days. In an embodiment, the period of time can be about 60 days. In an embodiment, contacting the sawdust and corn stover-based biochar with the soil can include mixing the sawdust and corn stover-based biochar with the soil to provide a mixture and maintaining the mixture for the period of time.

Saline soils include water-soluble salts that can inhibit plant growth. The salts can include chlorides, sulfates, carbonates, and/or nitrates of calcium, magnesium, sodium and potassium. In an embodiment, the saline soil can include a mixture of $NaCl$, $Ca(OH)_2$, and/or $Ca(SO)_4$, at concentrations of about 4.12%, about 3.87%, and about 2.67%, respectively.

In an embodiment, the sawdust and corn stover-based biochar mixed in the saline soil (on a dry weight basis) can range from about 5% to about 15% by weight, e.g., about 6%, about 8%, or about 10%, by weight. The biochar can adsorb salts in the saline soil and reduce downward soil salinity. Treatment of the saline soil with the biochar can improve soil structure, soil porosity, and moisture retaining capacity. The biochar presence can also enhance ion exchange capacity and ion transfer efficiency of nitrogen and phosphate uptake in the saline soil.

According to an embodiment, a sawdust and corn stover-based biochar can be prepared by hydrothermally carbonizing a mixture including equal proportions of corn stover and sawdust. Hydrothermal carbonization can include applying high temperatures and pressure to the mixture in the presence of moisture to provide a carbon-rich substance. In an embodiment, the equal proportions of corn stover and sawdust can be hydrothermally carbonized in a reactor at a temperature ranging from about 200° C. to about 325° C. at a pressure ranging from about 1 bar to about 3 bars, and for a period of time ranging from about 4 hours to about 7 hours, to produce a hydrochar.

In an embodiment, a biomass and water ratio in the reactor can be about 1:10. In an embodiment, a mixture including about 50% sawdust and about 50% corn stover can be hydrothermally carbonized at about 260° C., at about 2 bars, with a reaction time of about 6 hours. The resulting hydrochar can then be dried to produce the sawdust and corn stover-based biochar.

In an embodiment, the hydrochar can be dried by exposure to sunlight, followed by heating in an oven. In an embodiment, the hydrochar can be dried in an oven at a temperature ranging from about 100° C. to about 110° C. for about 5 hours to about 10 hours. In an embodiment, the hydrochar can be dried in an oven at a temperature of about 105° C. for about 8 hours.

The present subject matter can be better understood by referring to the following examples.

EXAMPLES

Example 1

Preparation of Biochar

The biochar was produced by subjecting a mixture including 50% corn stover and 50% sawdust to hydro-carbonization at a temperature of 260° C. and a pressure of 2 bars, with a reaction time of 6 hours, while maintaining a biomass and water ratio of 1/10 in the reactor. The produced hydrochar was then dried under the sun and then in an oven at 105° C. for 8 hours to provide the biochar.

Saline soil was collected from the fields, which included $NaCl$, $Ca(OH)_2$, and $Ca(SO)_4$, at 4.12%, 3.87%, and 2.67% concentrations, respectively, on a dry weight basis. The prepared dried biochar was then mixed with the soils in 6%, 8% and 10% ratios on a dry weight basis of saline soil. The best results were achieved with 10% biochar addition after 60 days of reaction time with soil. The biochar adsorbed all the salts. Consequently, downward soil salinity was reduced for $NaCl$ to 2.04%, for $Ca(OH)_2$ to 1.47%, and for $Ca(SO)_4$ to 1.24%. The addition of biochar also improved soil structure, soil porosity, and moisture retaining capacity by up to 34%, compared to an untreated saline soil sample. The biochar presence also enhanced ion exchange capacity and ion transfer efficiency of nitrogen and phosphate uptakes when mixed in saline soil.

It is to be understood that the present methods and compositions are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of reducing salinity of saline soil, comprising: providing a sawdust and corn stover-based biochar; contacting the sawdust and corn stover-based biochar with the saline soil; and adsorbing salts in the soil with the sawdust and corn stover-based biochar; wherein the sawdust and corn stover-based biochar is prepared by hydrothermally carbonizing a mixture including equal proportions of corn stover and sawdust.

2. The method of claim 1, wherein the equal proportions of corn stover and sawdust are hydrothermally carbonized in a reactor at a temperature ranging from about 200° C. to about 325° C., at a pressure ranging from about 1 bar to about 3 bars, and for a period of time ranging from about 4 hours to about 7 hours to produce a hydrochar.

3. The method of claim 1, wherein a mixture including about 50% sawdust and about 50% corn stover is hydrothermally carbonized at about 260° C., at about 2 bars, with a reaction time of about 6 hours to produce a hydrochar.

4. The method of 3, further comprising drying the hydrochar to provide the sawdust and corn stover-based biochar.

5. The method of claim 4, wherein the hydrochar is dried by exposure to sunlight and heating in an oven.

6. The method of claim 5, wherein the hydrochar is heated in an oven at a temperature ranging from about 100° C. to about 110° C. for about 5 hours to about 10 hours.

7. The method of reducing salinity of saline soil of claim 5, wherein the hydrochar is dried in an oven at a temperature of about 105° C. for about 8 hours.

8. A method of reducing salinity of saline soil, comprising:
preparing a sawdust and corn stover-based biochar, comprising:
hydrothermally carbonizing equal proportions of corn stover and sawdust in a reactor at a temperature ranging from about 200° C. to about 325° C., at a pressure ranging from about 1 bar to about 3 bars, and for a period of time ranging from about 4 hours to about 7 hours to produce a hydrochar; and drying the hydrochar to provide the sawdust and corn stover-based biochar contacting the sawdust and corn stover-based biochar with the saline soil; and adsorbing salts in the soil with the sawdust and corn stover-based biochar.

9. The method of claim 8, wherein the contacting comprises mixing the sawdust and corn stover-based biochar with the soil to provide a mixture and maintaining the mixture for a period of time.

10. The method of claim 9, wherein the period of time ranges from about 40 days to about 75 days.

11. The method of claim 9, wherein the period of time is 60 days.

* * * * *